United States Patent
Madsack

[11] Patent Number: 5,419,417
[45] Date of Patent: May 30, 1995

[54] VISCOUS COUPLING

[75] Inventor: Heinz Madsack, Overath, Germany

[73] Assignee: GKN Viscodrive GmbH, Lohmar, Germany

[21] Appl. No.: 186,772

[22] Filed: Jan. 26, 1994

[30] Foreign Application Priority Data

Feb. 1, 1993 [DE] Germany ............... 43 02 749.0

[51] Int. Cl.⁶ ............................................. F16D 35/00
[52] U.S. Cl. ...................... 192/58 B; 192/58 C; 192/70.2; 192/112
[58] Field of Search ............ 192/58 B, 58 C, 112, 192/70.13, 70.2; 29/889.5

[56] References Cited

U.S. PATENT DOCUMENTS

| 2,879,872 | 3/1959 | Ranst | 192/58 B X |
| 3,788,098 | 1/1974 | Miller et al. | |
| 4,432,254 | 2/1984 | Schultz | 192/58 B X |
| 5,054,596 | 10/1991 | Taureg et al. | 192/58 B |
| 5,101,951 | 4/1992 | Wiese et al. | 192/58 B |
| 5,295,908 | 3/1994 | Schumann et al. | 192/58 B X |
| 5,330,040 | 7/1994 | Drennen | 192/58 B |

FOREIGN PATENT DOCUMENTS

| 3928975 | 5/1990 | Germany. | |
| 4010195 | 10/1991 | Germany. | |
| 58-152941 | 9/1983 | Japan | 192/58 C |
| 3-288017 | 12/1991 | Japan | 192/112 |

Primary Examiner—Andrea L. Pitts
Attorney, Agent, or Firm—Harness, Dickey & Pierce

[57] ABSTRACT

A viscous coupling (1) has a housing (2) with a housing casing (5) made of a softer material and covers (8, 9) adjoining the casing at its ends, made of a harder material. The two covers (8, 9) have sealing edges (22, 23). The two covers (8, 9) are tensioned relative to the end faces (6, 7) of the housing casing (5) and, via their sealing edges (22, 23), penetrate the end faces (6, 7).

12 Claims, 3 Drawing Sheets

VISCOUS COUPLING

BACKGROUND OF THE INVENTION

The invention relates to a viscous coupling having a housing and a hub which are arranged coaxially around one another. The housing includes a tubular housing casing and radially inwardly directed flanges at its end faces. The hub is rotatably accommodated in bores of the flanges. Inner plates and outer plates are arranged to be partially overlapping in the inner space defined by the housing and the hub. The inner and outer plates are arranged in a certain sequence. The annular inner plates, via teeth, are received on the outer face of the hub. The annular outer plates, via teeth, which are arranged on their outer circumference, are received in corresponding teeth of the housing casing. The part of the inner space not occupied by plates is at least partially filled with a highly viscous medium, such as silicone oil.

In the case of viscous couplings, it is known to provide the inner face of a housing casing made of steel with longitudinally extending teeth which are produced by broaching. The two side covers adjoining the end faces of the housing casing are connected to the housing casing by welding. However, in such a case, the coupling cannot be dismantled without being destroyed.

There are also prior art solutions in which one of the covers is welded to the housing casing and the other cover is inserted into the housing casing and secured therein by a securing ring. In this case a seal is inserted between the housing casing and the cover. The above-described designs are expensive.

SUMMARY OF THE INVENTION

It is an object of the invention to provide a viscous coupling which is cost-effective to produce, but which nevertheless functions fully to seal the housing interior.

In accordance with the invention, if viewed in cross-section, the wall of the tubular housing casing is corrugated. Also, the flanges, towards the end faces of the housing casing, each include at least one projecting edge following the configuration of the wall. The flanges are tensioned relative to the end faces and at least one of the corrugation valleys of the housing casing serves to non-rotatingly receive a corresponding projection of the teeth of the outer plates.

Such an embodiment is advantageous since it is possible to use a reasonably priced extrusion profile to produce the housing casing. The extrusion profile is designed such that its inner contour is suitable to receive the teeth of the outer plates. Thus, there is no need for special machining measures relating to the production of the teeth.

In a further advantage, it is possible to obtain a wall which, in cross section, has a substantially uniform thickness to ensure uniform heat dissipation.

Furthermore, there is no need, as there is in the case of a divided design, for soft seals to seal the region between the housing casing and cover. The embodiment in accordance with the invention ensures a leak-proof connection. Also, a welding operation is not required.

As compared to the coupling version where both housing covers are welded to the housing casing after the plates have been fitted, a further advantage exists in that there is no risk of damaging heat effects when attaching the second cover.

In a preferred embodiment, at least three of the inner corrugation valleys of the housing casing serve to non-rotatingly receive corresponding projections of the teeth of the outer plates. According to a further embodiment of the invention, the inwardly directed corrugation peaks constitute a cylindrical face of an imaginary hollow cylinder whose axis is centered on the longitudinal axis of the housing. In this way, the inwardly directed corrugation peaks can easily be used for centering the covers.

To secure the covers relative to one another and relative to the housing casing, the flanges are tensioned relative to one another and relative to the end faces of the housing casing by circumferentially distributed bolts arranged on the housing casing or by riveted or anchored tie rods. Likewise, the riveted or anchored tie rods would be circumferentially distributed on the housing as mentioned with respect to the bolts. By selecting bolts, it is possible to obtain a unit which can be dismantled. However, tie rods, too, whose ends are riveted permit a relatively simple dismantling procedure.

To easily center the cover relative to the housing casing, the bolts or tie rods are each arranged at the flange to correspond to an outer corrugation valley and are at least partially received therein. When designing the sealing edges at the flanges it was taken into account that by taking advantage of the arrangement of the bolt holes, they are aligned relative to the extension of the wall of the housing casing. The bolts or tie rods serve to circumferentially center the flanges relative to the housing casing. By arranging the bolts or tie rods with their respective shanks in such a way that they are at least partially received in the outer corrugation valleys, the diameter is reduced, providing a further advantage.

According to a further embodiment, the flanges are centered on the inwardly directed corrugation peaks of the housing casing. In this case, the flanges are provided with an annular projection which engages the housing casing from the end faces.

Circumferential centering between the flanges and the housing casing may also be effected by providing the flanges with at least one projection projecting towards the inner space and engaging an inner corrugation valley.

The sealing edges have a triangular cross-section and are provided with an acute angle at the edge penetrating the end faces of the housing casing to achieve a particularly advantageous sealing effect.

The housing casing is preferably made of a softer material than the flanges. It has been found to be particularly advantageous for the housing casing to be of an aluminum material and for the flanges to be steel, a cast steel material or a sintered metal.

From the following detailed description taken in conjunction with the accompanying drawings and subjoined claims, other objects and advantages of the present invention will become apparent to those skilled in the art.

BRIEF DESCRIPTION OF THE DRAWINGS

Preferred embodiments of the invention are diagrammatically illustrated in the drawing wherein.

DETAILED DESCRIPTION OF THE PREFERRED EMBODIMENTS

Figure 1:
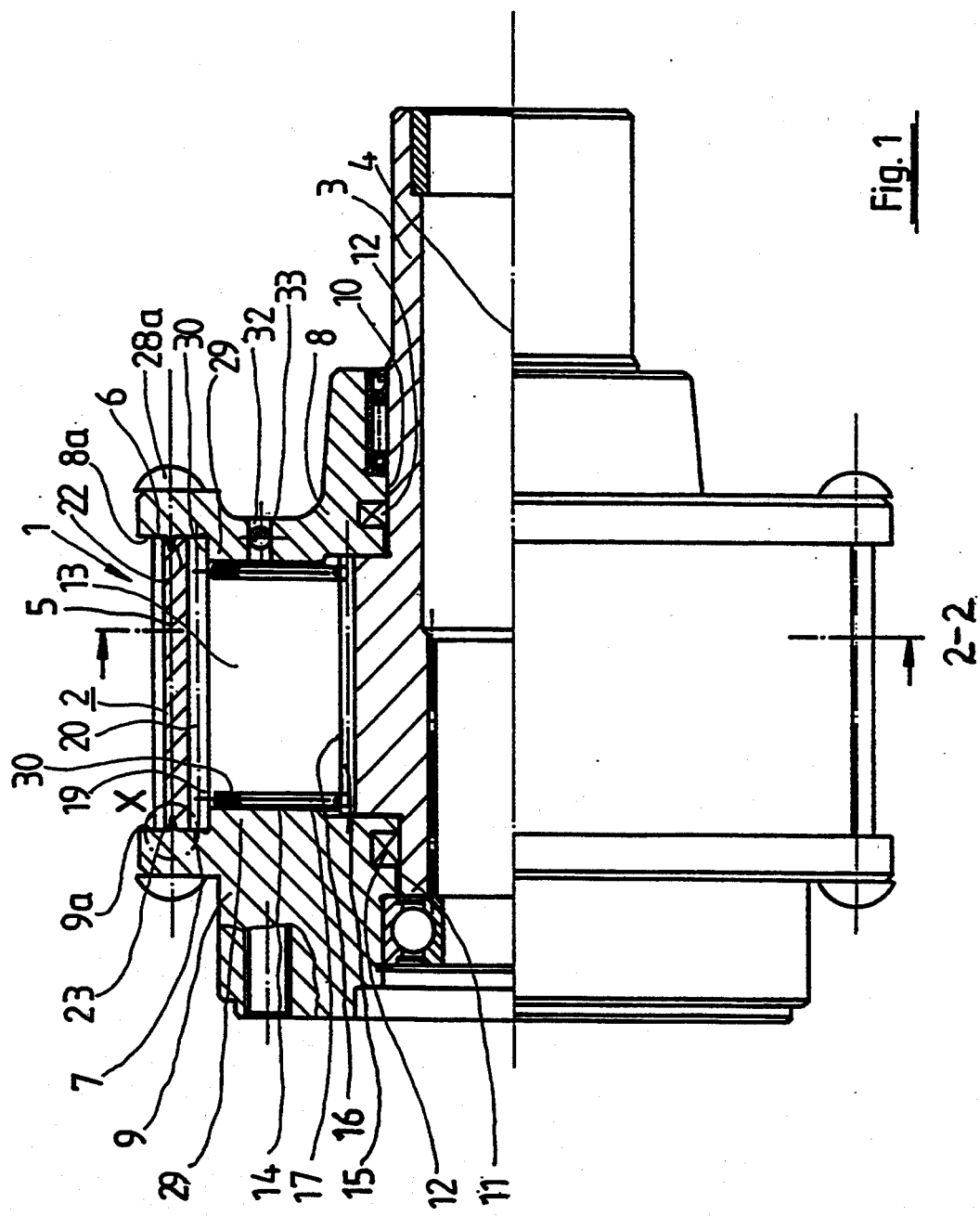
FIG. 1 is a partial longitudinal section view of a first embodiment of a viscous coupling in accordance with the present invention.
Figure 2:
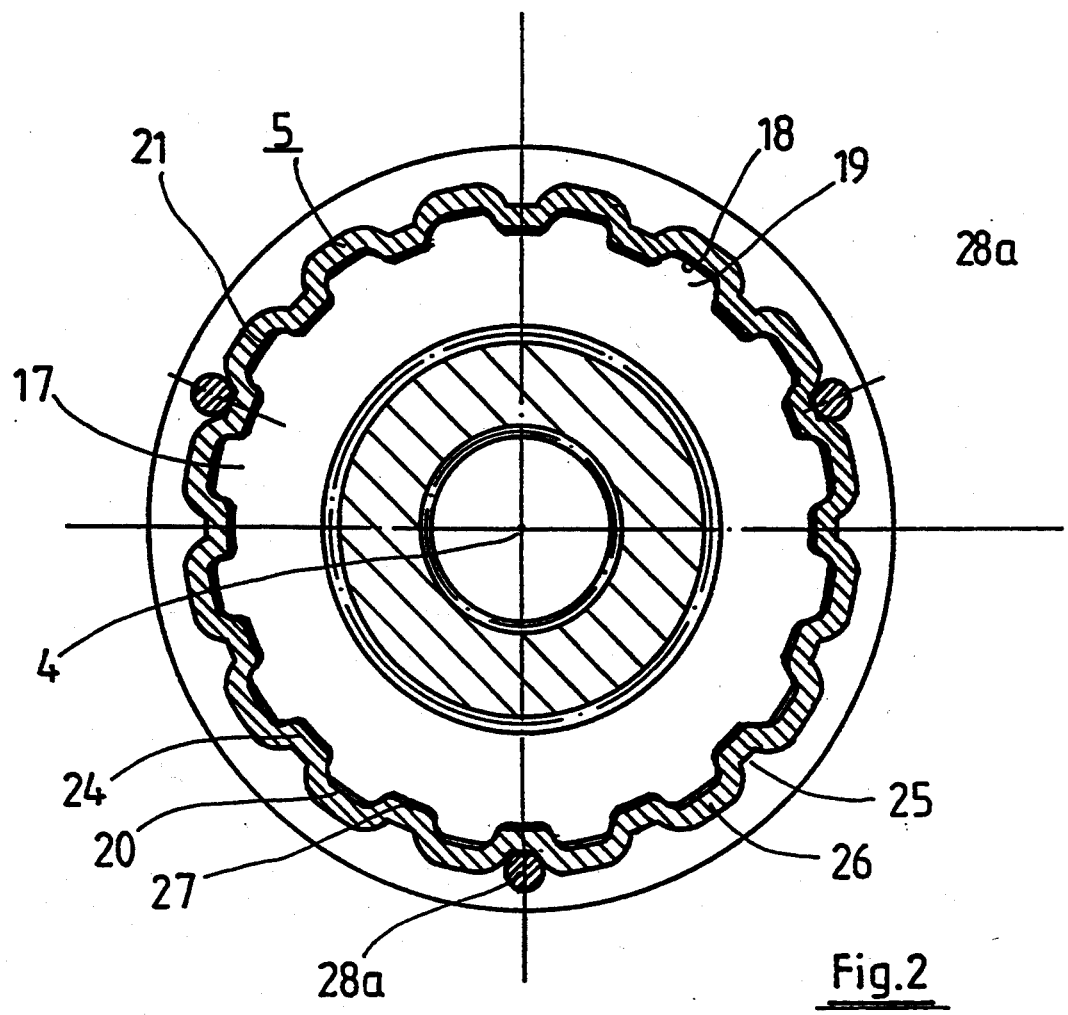
FIG. 2 is a cross sectional view of FIG. 1 along line 2—2 thereof.

FIGS. 1 and 2 show a first embodiment of the viscous coupling 1. The viscous coupling 1 includes housing 2 and hub 3 which, with reference to a longitudinal axis 4, are arranged coaxially around one another. The housing 2 includes a tubular housing casing 5 and flanges 8, 9 secured at the two end faces 6, 7. The flanges 8, 9, via their contact faces 8a, 9a, rest against the housing casing end faces 6, 7. The two flanges 8, 9 each include a central bore 10, 11 which rotatably receives the hub 3, via seat faces. Between the seat faces of the hub 3 and the two bores 10, 11, seals 12 are arranged to seal the housing interior 13 relative to the outside.

On its outer face 16, the hub 3 has teeth 15 which non-rotatingly receive inner plates 14. The inner plates 14 are arranged in a desired sequence to alternate with outer plates 17. The inner plate bores include teeth which correspond to the teeth 15 provided in the outer face 16 of the hub 3.

The outer plates 17 and inner plates 14 at least partially overlap in the radial direction. The outer plates 17, via teeth 19, on their outer circumference 18, engage corresponding contours of the housing casing which have yet to be described in greater detail.

As shown in the cross-section according to FIG. 2, the housing casing 5 is tubular. Its wall 21, if viewed in cross-section, is corrugated. The corrugation includes inwardly directed, inner corrugation valleys 20 which alternate with inner corrugation peaks 24. Accordingly, the outer contour of the wall 21 of the housing casing 5, in the region of the inner corrugation peaks 24, includes outer corrugation valleys 25 and, in the region of the inner corrugation valleys 20, it has outer corrugation peaks 26. The inwardly directed faces of the inner corrugation peaks 24 form part-cylindrical faces 27 with reference to the longitudinal axis 4. The outer plates 17, via their teeth 19, engage the inner corrugation valleys 20 of the housing casing 5 which serve as counter-teeth for the teeth 19 at the outer circumference 18 of the outer plates 17. The cylindrical faces 27 also center the outer plates 17.

The housing casing 5 is produced in the form of an extruded aluminum profile. As can be seen in the cross-section according to FIG. 2, the wall thickness on the circumference of the housing casing is substantially uniform. In this way, it is possible to achieve a constant heat dissipation from the interior 13 of the coupling when the housing 2 and hub 3 rotate relative to one another.

The flange 8 adjoins the end face 6 of the housing casing 5. The flange 8 has an annular projection 29 whose outside is provided with a centering face 30 by means of which the flange 8 engages the housing casing 5. The centering face 30 centers the flange 8 at the cylindrical face 27 on the inwardly directed corrugation peaks 24 relative to the longitudinal axis 4.

Figure 4:
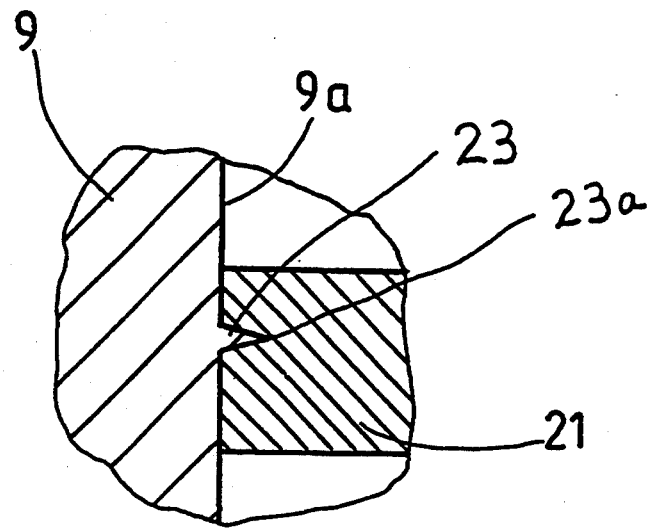
FIG. 4 is an enlarged cross sectional view of the detail within the circle X of FIG. 1.

The flange 9 includes a corresponding annular projection 29 which is also provided with a centering face 30 by means of which it, too, is centered at the cylindrical faces 27 of the inner corrugation peaks 24 of the housing casing 5. At their contact faces 8a, 9a, both flanges 8, 9 include a sealing edge 22, 23 as shown in an enlarged scale in FIG. 4 with reference to the flange 9. The cross-section of the sealing edge 23 has the shape of an acute-angled triangle. The acute angle is located in the region of the point 23a. The flanges 8 includes a corresponding sealing edge 22. In the tensioned, fitted condition, the sealing edges 22, 23 engage the end faces 6, 7 of the housing casing 5. Such penetration ensures a sealing effect between the flanges 8, 9 on the one hand and the housing casing 5 on the other hand. In the case of the embodiment according to FIGS. 1 and 2, the two flanges 8, 9 are tensioned relative to the end faces 6, 7 of the housing casing 5 by tie rods 28a.

The tie rods 28a axially extend through bores in the flanges 8, 9 and are riveted to the flange faces facing away from the contact faces 8a, 9a so that they are tensioned relative to one another and relative to the end faces 6, 7 in such a way that the sealing edges 22, 23 penetrate the end faces of the housing casing 5. The housing casing 5 is of a softer material such as aluminum. The flanges 8, 9 preferably are of cast steel, a cast iron material or sintered metal. The shape of the point of the sealing edges 22, 23 is adapted to the corrugated shape of the wall 21 of the housing casing 5. The tie rods 28a are circumferentially distributed with reference to the housing casing 5. The tie rods 28a are arranged such that at least part of their diameter is received in an outer corrugation valley 25. This measure at the same time ensures that the flanges 8, 9 are circumferentially centered relative to the contour of the housing casing 5 which, in turn, ensures that the sealing edges 22, 23 extend accordingly and are actually able to penetrate the full material of the end faces 6, 7.

Figure 3:
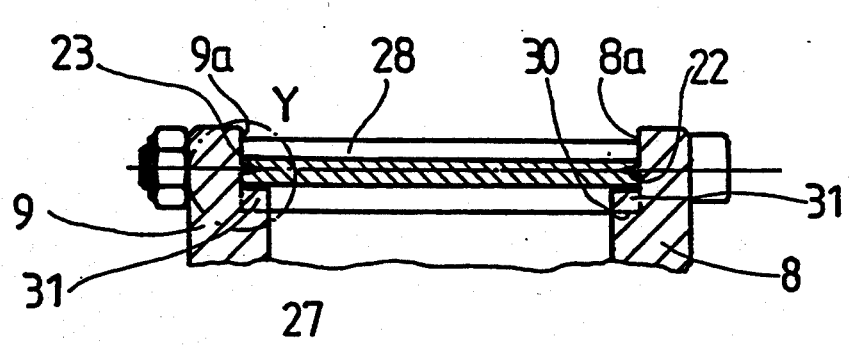
FIG. 3 is a cross sectional view of a second embodiment of the present invention.
Figure 5:
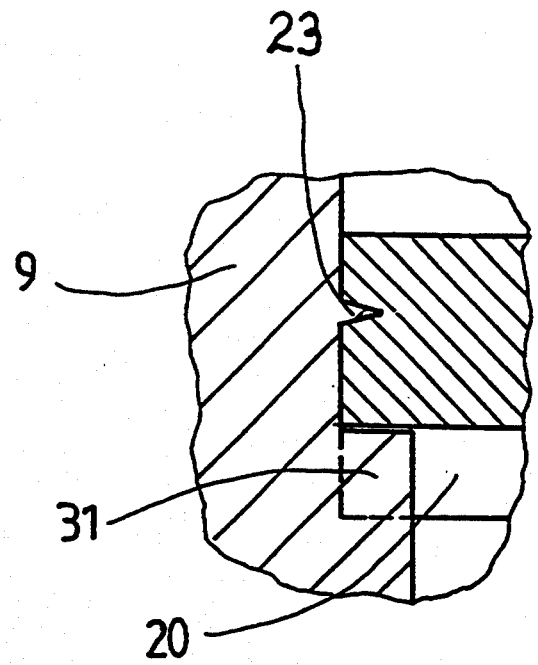
FIG. 5 is an enlarged cross sectional view of the detail within circle Y of FIG. 3.

In the case of the embodiment according to FIGS. 3 and 5, the tie rods 28a are replaced by bolts 28. Furthermore, circumferential centering is additionally effected by at least one projection 31. The projection 31, which starts from the centering face 30, engages an inner corrugation valley 20.

In the case of one of the flanges, flange 8, an axially extending bore 32 is provided which serves as a filling bore for filling a highly viscous medium into the inner space 13 and which is sealed by a sealing ball 33. Such a medium could be a highly viscous silicone oil for example. The inner space 13 not occupied by inner plates 14 and outer plates 17 is at least partially filled with this medium. When the housing 2 rotates relative to the hub 3, a relative displacement also takes place of the inner plates 14 and outer plates 17 relative to one another so that the silicone oil contained therebetween is sheared, which results in a corresponding reaction moment. Such viscous couplings are used in the driveline of a motor vehicle for example for transmitting a torque from the permanently driven axle to the wheels of the non-permanently driven axle. Furthermore, they may also be used for example for at least partially locking the differential function of a differential gear arranged in the longitudinal driveline of a four wheel drive vehicle or in an axle.

While the above detailed description describes the preferred embodiment of the present invention, the invention is susceptible to modification, variation, and alteration without deviating from the scope and fair meaning of the subjoined claims.

What is claimed is:

1. A viscous coupling comprising:

a housing and a hub which are coaxially arranged around one another, said housing including a tubular housing casing and radially inwardly directed flanges at end faces of said housing casing;

said hub being rotatably accommodated in bores of the flanges;

inner plates and outer plates which are arranged so as to be partially overlapping in an inner space defined between said housing and said hub and said plates arranged in a desired sequence, said inner plates being received in teeth arranged on an outer face of the hub and the outer plates, by means of teeth arranged on their outer circumference, being received in corresponding teeth of the housing casing and part of an inner space not occupied by said plates being at least partially filled with a highly viscous medium; the tubular housing casing having a corrugated wall, when viewed in cross section; the flanges, towards the end faces of the housing casing, each having at least one projecting edge following the configuration of the wall, the flanges being tensioned relative to the end faces and at least one corrugation valley of the housing casing non-rotatingly receiving a corresponding projection of the teeth of the outer plates.

2. A viscous coupling according to claim 1, wherein at least three inner corrugation valleys of the housing casing non-rotatingly receive corresponding projections of teeth of the outer plates.

3. A viscous coupling according to claim 1, wherein the inwardly directed corrugation peaks constitute a cylindrical face defining a hollow cylinder whose axis is centered on the longitudinal axis of the housing.

4. A viscous coupling according to claim 1, wherein the flanges are tensioned relative to one another and relative to the end faces of the housing casing by bolts or by riveted or anchored tie rods all arranged so as to be distributed on the circumference of the housing casing.

5. A viscous coupling according to claim 4, wherein the bolts or tie rods are each arranged at the flange so as to correspond to an outer corrugation valley of the housing casing and are at least partially received therein.

6. A viscous coupling according to claim 5, wherein the bolts or tie rods serve to circumferentially center the flanges relative to the housing casing.

7. A viscous coupling according to claim 1, wherein the flanges are centered on inwardly directed corrugation peaks of the housing casing.

8. A viscous coupling according to claim 7, wherein the flanges are provided with an annular projection by means of which they engage the housing casing from the end faces.

9. A viscous coupling according to claim 1, wherein the flanges are centered circumferentially by at least one projection projecting towards the inner space and engaging an inner corrugation valley.

10. A viscous coupling according to claim 1, wherein the flanges include sealing edges having a triangular cross-section and include an acute angle at the edge penetrating the end faces of the housing casing.

11. A viscous coupling according to claim 1, wherein the housing casing is of a softer material than the material of the flanges.

12. A viscous coupling according to claim 11, wherein the housing casing is of an aluminum material and that the flanges are steel or a cast iron material.

* * * * *